United States Patent Office 3,367,948
Patented Feb. 6, 1968

3,367,948
NOVEL D-THREO-1-PHENYL-2-AMINO-PROPANE-
1,3-DIOL-DERIVATIVES
Fritz Gapp, Hans Margreiter, and Ekkehard Schmid,
Tyrol, Austria, assignors to Biochemie Gesellschaft
mit beschränkter Haftung, Kundl Tyrol, Austria, a
corporation of Austria
No Drawing. Filed Feb. 26, 1965, Ser. No. 435,729
Claims priority, application Austria, Mar. 2, 1964,
A 1,810/64
11 Claims. (Cl. 260—349)

ABSTRACT OF THE DISCLOSURE

Compounds having antibiotic properties and of the following type are disclosed. They are D-threo-1-phenyl-2-amino propane-1,3-diol derivatives of the general formula

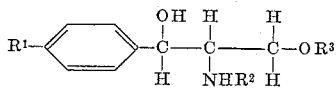

wherein $R^1$ may preferably be a nitro group, $R^2$ may be a $Cl_2CH-$ or $N_3CH_2$-group and $R^3$ may be a radical of a carbamido monocarboxylic or dicarboxylic acid.

---

The present invention relates to novel derivatives of 1-phenyl-2-amino propane-1,3-diol and more particularly to novel D-threo-1-phenyl-2-amino propane-1,3-diol derivatives, and to methods of preparing same.

It is one object of the present invention to provide new and valuable compounds of chloramphenicol and its analogues, which are characterized by their valuable pharmacological properties.

Another object of the present invention is to provide simple and effective methods of producing such new and valuable 1-phenyl-2-amino propane-1,3-diol compounds.

A further object of the present invention is to provide new and valuable pharmaceutical compositions useful in therapy.

Still another object of the present invention is to provide novel D-thero-1-phenyl-2-amino propane-1,3-diol derivatives causing prolonged blood level values of the antibiotic agent.

Still another object of the present invention is to provide novel antibiotic agents which are characterized by their excellent antibiotic activity and high compatibility.

Still another object of the present invention is to provide novel antibiotic agents, which are stable in aqueous solution or suspension, and which can be sold in the form of aqueous preparations that will keep.

Other objects of the present invention and advantageous features thereof will become apparent as the description proceeds.

Compounds according to the present invention which have valuable pharmaceutical properties are D-threo-1-phenyl-2-amino propane-1,3-diol derivatives of the general formula

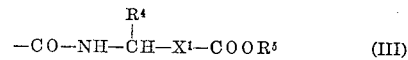  (I)

in which the p-position of the phenyl group ($R^1$) and/or the amino group of the propanediol ($R^2$) bear specific substituents which agree with those of the chloramphenicol or which may also differ from them. In the above general formula
$R^1$ is hydrogen, a nitro group, a cyano group, a methyl sulfonyl group, a methylthio group ($CH_3S$), a primary amino group, an acylated amino group XCONH—, wherein X means an aliphatic, araliphatic or aromatic radical, particularly a hydrocarbon radical, or a halogen atom, especially chlorine, $R^2$ represents an XCO-group, wherein X has the above stated meaning and more particularly stands for a $Cl_2CH-$ or $N_3CH_2$-group.

$R^3$ indicates a radical of an ester of a carbamido carboxylic acid or of a carbamidocarboxylic acid, particularly a radical of Formula III:

$$-CO-NH-\overset{R^4}{\underset{|}{C}H}-X^1-COOR^5 \qquad (III)$$

wherein:
$R^4$ is a hydrogen atom, an alkyl radical containing up to 6 carbon atoms, possibly with an interposed hetero-atom, such as sulphur, a carbalkoxy or carbalkoxyalkyl radical or an aryl radical,
$R^5$ is a lower molecular weight alkyl radical or hydrogen and
$X^1$ is a direct C—C bond or a —$(CH_2)_n$-grouping, wherein $n$ is an integer between 1 and 6.

The present invention also relates to the salts of acids of general Formula I with inorganic or organic bases.

The preferred and most effective compounds according to Formula I of this invention are such compounds, wherein
$R^1$ means a nitro group or a dichloro acetamido group,
$R^2$ stands for an $N_3-CH_2-CO$-group, a $Cl_2CH-CO$-group, a (lower) alkanoyl group, a phenoxy (lower) alkanoyl group, a phenyl (lower) alkanoyl group or a benzoyl group, and
$R^3$ indicates a radical of a carbamido monocarboxylic acid or carbamido dicarboxylic acid containing 3 to 10 carbon atoms, of a salt or of a lower alkyl ester thereof.

The novel D-threo-1-phenyl-2-amino-propane-1,3-diol derivatives and the salts of the corresponding acids may be obtained by reacting compounds of the general Formula II:

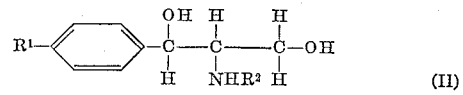  (II)

wherein
$R^1$ and $R^2$ have the above stated meaning, with esters of isocyanatocarboxylic acid, possibly saponifying the corresponding D-threo-1-phenyl-2-amino-propane-1,3-diol carbamidocarboxylate product to the corresponding carbamido carboxylic acid and, if desired, salifying the resultant acid with inorganic or organic bases.

This method is based on the reaction of esters of isocyanato carboxylic acids with the primary hydroxyl group of the D-threo-1-phenyl-2-amino-propane-1,3-diol compound of the general Formula II, causing the formation of the corresponding esters of carbamido carboxylic acids which can be selectively saponified to the corresponding free acids. It was initially uncertain whether in the case of compounds of general Formula II this reaction would lead to the formation of uniform products because both primary and secondary hydroxyl groups readily react with esters of isocyanato carboxylic acids. It is known from the literature (Glazko et al., Antib. Annual 1957/58, 792) that mixtures of mono- and disuccinate were first obtained in the preparation of chloramphenicol succinate. It was also uncertain whether the selective saponification of the ester grouping would be feasible without the dichloroacetyl or the azidoacetyl radical being detached. It was therefore surprising when it was found that compounds of the general Formula II react with esters of isocyanato carboxylic acids primarily at the hydroxyl group and that uniform monoderivatives result. It was also unexpected to find that good yields of the above esters could be selectively saponified to the corresponding acids.

When using chloramphenicol as the starting reactant of general Formula II, the method for synthesizing the novel compounds of the general Formula I can be illustratively exemplified by the following reaction scheme, wherein R and R' may be alkyl radicals:

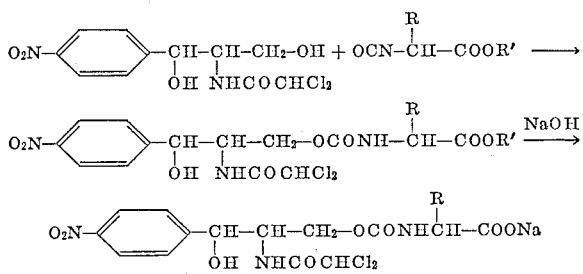

Preferred starting reactants of general Formula II besides chloramphenicol for performing the method according to the invention are D(—)-threo-1-p-nitrophenyl-2-azidoacetylamido propane-1,3-diol

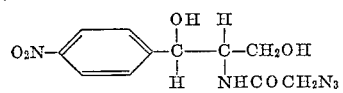

and a 4'-mehtylsulphonyl homologue of chloramphenicol having the formula

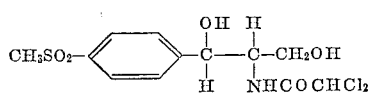

In the performance of the method according to the invention ethyl acetate is conveniently used as the reaction medium. However, the reaction can also be performed in butyl acetate, isobutylacetate, dioxane, tetrahydrofuran, dimethyl formamide, formamide, acetone, methylisobutyl-ketone, benzene, toluene and other organic solvents.

The reaction is accelerated by tertiary bases, such as triethylamine and dimethylaniline, besides pyridine.

Conveniently the reaction is performed at room temperature. In some cases it is advantageous to heat the reaction mixture.

The saponification of the resultant esters to the corresponding acids can be effected with alkali hydroxides or carbonates or alkaline earth hydroxides or carbonates, as well as with primary, secondary and tertiary amines and hydroxyalkylamines.

In a manner known to the art water-soluble amine, alkali or alkaline earth salts, for instance, of Na, K, Ca, ammonium and the like, which form stable aqueous solutions, can be prepared from the acids thus obtained. Moreover, organic bases, such as dibenzylamine or derivatives of ethylene diamine, such as dibenzyl ethylene diamine, likewise permit crystalline salts to be prepared which, owing to their low solubility in water, can be used as products that have a depot effect in the same way as the novel esters of chloramphenicol carbamido carboxylic acids and the corresponding free acids.

Among the novel D-threo-1-phenyl-2-amino propane-1, 3-diol derivates those compounds are preferred which are obtained by reacting compounds of the general Formula II with esters of isocyanato carboxylic acids of the general Formula IV:

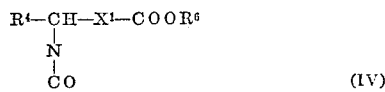

wherein $R^4$ and $X^1$ have the above specified meanings and
$R^6$ is a lower molecular alkyl group.

Particular examples of reaction components of this general formula are alkyl esters of α-isocyanato acetic acid, alkyl esters of α-isocyanato-γ-methyl mercapto butyric acid, alkyl esters of α-isocyanato isocaproic acid, alkyl esters of α-isocyanato isovaleric acid, alkyl esters of α-isocyanato propionic acid, alkyl esters of α-isocyanato-(phenyl)- acetic acid, dialkyl esters of α-isocyanato glutaric acid, dialkyl esters of α-isocyanato succinic acid and alkyl esters of ε-isocyanato caproic acid.

The following examples are further illustrative of the method of the present invention, and it will be understood that the invention is not limited thereto.

*Example 1*

(a) Ethyl-chloramphenicol carbamidoacetate.

323 g. (1 mol) of chloramphenicol were suspended in 1000 ml. of ethyl acetate. 160 ml. of pyridine and 129 g. (1 mol) of ethyl-isocyanatoacetate were added. By allowing the mixture to stand at room temperature with occasional shaking, solution was completed after a short time. At the end of 3 hours the reaction product began to crystallise in the form of white needles. At the end of another 40 hours the crystal magma was filtered off with suction at room temperature, washed with ether and dried. 325 g. of colourless crystals melting at 138 to 140° C. were obtained. A further quantity of 53.3 g. crystallised from the mother liquor after extraction of the pyridine with dilute hydrochloric acid and concentration of the ethyl acetate solution. The total yield was 83.6% of theory. Summary formula: $C_{16}H_{19}O_8N_3Cl_2$.

*Analysis.*—Calculated: C, 42.49%; H, 4.23%. Found: C, 42.69%; H, 4.39%.

The ester could be recrystallised from ethanol, ethyl acetate or acetone.

(b) Chloramphenicol carbamidoacetic acid.

For saponification 100 g. of the ester obtained according to (a) were suspended in 300 ml. of ethanol. In the course of one hour 115 ml. of a 2 N solution of sodium hydroxide were added dropwise at room temperature, with stirring. The ester then dissolved. After the solution had been kept standing at room temperature for 10 hours the pH had dropped to 7. After concentration in vacuo the solution was diluted with water and slowly acidified with dilute hydrochloric acid, causing the acid to crystallise in pure form. When the product had been filtered off, washed with water and dried, 80.7 g. of acid (i.e. 86% of theory) melting at 150 to 153° C. were obtained. The acid could be recrystallised from water, ethanol, acetone or ethyl acetate. Summary formula: $C_{14}H_{15}N_3O_8Cl_2$.

*Analysis.*—Calculated: C, 39.64%; H, 3.56%. Found: C, 39.93%; H, 3.74%.

(c) The sodium salt of chloramphenicol carbamido acetic acid.

4.24 g. of the acid obtained as described in (b) were dissolved in 10 ml. of a 1-molar solution of sodium ethyl hexoate in acetone, 100 ml. of ether being added. The sodium salt which initially separated in the form of an oil became solid when rubbed. The product was filtered off with suction, washed with ether and dried.

Yield: 4.5 g. (93% of theory), a white non-hygroscopic, water-soluble powder. Melting point 120–130° C.

The sodium salt could also be obtained by evaporating aqueous solutions of the sodium salt.

Moreover, the sodium salt could be directly isolated from the saponification mixture (obtained as described under (b)) by evaporating the saponified neutral solution in vacuo until dry and recrystallising the residue for purification from a mixture of ethanol and ether.

(d) The potassium salt of chloramphenicol carbamido acetic acid.

The potassium salt could be prepared analogously to (c) by using potassium ethyl hexoate or potassium acetate. It is a white non-hygroscopic powder.

(e) The calcium salt of chloramphenicol carbamido acetic acid.

0.79 g. of calcium acetate were added to a solution of 4.24 g. of chloramphenicol carbamido acetic acid in 50 ml. of ethanol, the solution being stirred for a while and then evaporated in vacuo. The residue was recrystallised from a mixture of ethanol and ether (1:1). Yield: 3.9 g. (88% of theory), a white, water-soluble powder. Melting point 160–165° C.

(f) The dibenzylamine salt of chloramphenicol carbamido acetic acid.

4.24 g. of acid (obtained according to (b)) were dissolved in 30 ml. of ethanol and 2 ml. of dibenzylamine were added. Water was then added with stirring until the solution became cloudy. The rapidly crystallising salt was filtered off and dried. It melts between 153 and 156° C. and at room temperature its solubility in water is 0.56%. The water content of the solid substance is 0.06%.

(g) The dibenzylethylene diamine salt of chloramphenical carbamido acetic acid.

A solution of 9 g. of the sodium salt (obtaining as described in (c)) in a mixture of 30 ml. of ethanol and 30 ml. of water was gently warmed and a solution of 3.6 g. of dibenzylethylenediamine diacetate, in 20 ml. of water was added. When the clear solution was cooled it rapidly crystallised. The crystal magma was filtered off with suction, washed with a little water and dried.

Yield: 8.7 g. (81% of theory) of the dibenzylethylene diamine salt melting between 112 and 116° C. Water content 2.13%. At 28° C. its solubility in water is 1.04%.

This salt can also be prepared from the free acid and the free base. The dibenzylethylenediamine salt can also be directly precipitated from saponification mixtures (cf. under (b)) from an aqueous solution by adding dibenzylethylene diamine acetate solutions.

In a manner analogous to that described in Example 1 the corresponding esters of chloramphenicol carbamido carboxylic acids or the carboxylic acids and their salts were prepared from chloramphenicol and the esters of isocyanatocarboxylic acids named in the table. Data relating to their chemical and physical properties are shown in Table 1.

*Example 11*

(a) Methyl-L-chloramphenicol carbamido isocapronate.

A mixture of 32.3 g. (0.1 mol) of chloramphenicol, 16 ml. of pyridine and 17.1 g. (0.1 mol) of methyl-L-isocyanato isocapronate were refluxed for 1 hour in 100 ml. of ethyl acetate. For removing the pyridine the yellow solution was then extracted with diluted hydrochloric acid, the ethyl acetate solution was dried and evaporated. The remaining oil solidified when rubbed with petroleum ether, yielding 41.3 g. of an amorphous material which slowly softened again over 70° C. By recrystallisation from an ethyl acetate and petroleum ether mixture 33.5 g. of crystallised substance (68% of theory) melting between 124 and 130° C. were obtained. For an analysis this was twice recrystallized from dilute ethanol. M.P.=133–134° C. Summary formula: $C_{19}H_{25}O_8N_3Cl_2$.

*Analysis.*—Calculated: C, 46.16%; H, 5.09%. Found: C, 46.62%; H, 5.19%.

(b) L-chloramphenicol carbamidoisocaproic acid.

For saponification 20 g. of the ester obtained under (a) were dissolved in 100 ml. of hot ethanol and 26 ml. of a 2 N solution of sodium hydroxide were added to the hot solution. At the end of about 1 hour the pH of the yellow solution that had meanwhile formed had dropped to 8.0. This was concentrated and then diluted with water, the resultant cloudiness being removed by extraction with ether. When the solution was acidified an oil precipitated which was extracted with ether. After drying, treating with active carbon and evaporating, 16.3 g. (83% of theory) of the amorphous acid were obtained, which slowly crystallized from aqueous ethanol. M.P.=86–88° C. Summary formula: $C_{18}H_{23}O_8N_3Cl_2$.

*Analysis.*—Calculated: C, 45.01%; H, 4.83%. Found: C, 44.85%; H, 4.87%.

With ethyl acetate, this acid forms a crystalline adduct having an M.P. of 124–127° C. Summary formula: $C_{18}H_{23}O_8N_3Cl_2 \cdot C_4H_8O_2$.

*Analysis.*—Calculated: C, 46.48%; H, 5.49%. Found: C, 46.10%; H, 5.26%.

(c) The sodium salt.

TABLE 1

| Ex. No. | Isocyanatocarboxylic acid ester | Chloramphenicolcarbamido-carboxylic acid esters | | | Chloramphenicolcarbamido-carboxylic acids | | | Salts of chloramphenicolcarbamido-carboxylic acids | |
|---|---|---|---|---|---|---|---|---|---|
| | | M.P., ° C. | Analysis, percent | | M.P., ° C. | Analysis, percent | | Salt | M.P., ° C. |
| | | | C | H | | C | H | | |
| 2 | Methyl-L-α-isocyanato-γ-methylmercaptobutyrate. | 171–172.5 | (C) 42.20 (F) 42.50 | (C) 4.52 (F) 4.60 | 141–144 | (C) 40.97 (F) 40.78 | (C) 4.25 (F) 4.03 | Sodium salt | |
| 3 | Methyl-DL-α-isocyanato-γ-methylmercaptobutyrate. | 115–140 | | | 132–136 | | | | |
| 4 | Methyl-D-α-isocyanato-γ-methylmercaptobutyrate. | 145–146 | (C) 42.20 (F) 42.17 | (C) 4.52 (F) 4.64 | Oily | | | Sodium salt | |
| 5 | Methyl-DL-α-isocyanato-isovalerate. | Oil | | | Oil | | | Sodium salt | 142–144 |
| 6 | Ethyl-DL-α-isocyanato-propionate. | 160–162 | | | 205–206 | (C) 41.11 (F) 41.31 | (C) 3.91 (F) 4.1 | | |
| 7 | Ethyl-L-α-isocyanato-(phenyl)-acetate (D-form). | 176–177 121–123 | (C) 49.04 (F) 48.77 | (C) 4.11 (F) 4.27 | Amorphous | | | Sodium salt | 166–170 |
| 8 | Dimethyl-L-α-isocyanato-glutarate. | 151–152 | | | 117–125 | (C) 41.15 (F) 40.90 | (C) 3.86 (F) 3.86 | | |
| 9 | Dimethyl-L-α-isocyanato-succinate. | 153–154 | (C) 42.36 (F) 42.25 | (C) 4.15 (F) 4.05 | Oily | | | | |
| 10 | Methyl-ε-isocyanato-capronate | 104–106 | (C) 46.16 (F) 46.63 | (C) 5.09 (F) 5.12 | Oily | | | | |

(C)=Calculated. (F)=Found.

In order to prepare the sodium salt the acid was dissolved in water with one equivalent of sodium hydroxide or sodium carbonate or sodium bicarbonate and the solution was evaporated until dry. Acetone was added for purification, the undissolved residue removed by filtration and the filtrate reconcentrated. The sodium salt was thus obtained in the form of a light white powder melting between 135 and 140° C.

(d) The dibenzylamine salt.

5 g. of the acid obtained as described in (b) were dissolved in 100 ml. of ether and 2.3 ml. of dibenzylamine were added to the solution. The precipitating dibenzylamine salt was filtered off with suction, washed with ether and dried. 5.9 g. of the dibenzylamine salt were obtained which melted between 160 and 165° C. For analysing the salt it was recrystallized from aqueous acetone and dried for 2 hours at 110° C. Summary formula: $C_{32}H_{38}N_4O_8Cl_2$.

*Analysis.*—Calculated: C, 56.72%; H, 5.65%. Found: C, 56.29%; H, 5.73%. Solubility in water: 0.08%.

The dibenzylamine salt can also be usefully employed for working up saponification mixtures according to (b) and for purification. To this end the oily acid is extracted with ether or dissolved and precipitated with dibenzylamine. After recrystallisation the dibenzylamine salt can be easily decomposed by dissolving it in a little dimethyl formamide, adding dilute acid and extracting with an organic solvent.

(e) The dibenzyl ethylene diamine salt.

5 g. of the sodium salt obtained as described in (c) were dissolved in 25 ml. of water and 50 ml. of ethanol as well as a solution of 2 g. of dibenzyl ethylene diamine diacetate in 25 ml. of water added. The precipitating crystallized dibenzyl ethylene diamine salt was filtered off with suction, washed with water and dried. 5.5 g. melting between 195 and 199° C. were obtained. For analysis this was recrystallized from ethanol. M.P.=198–201° C. Summary formula: $C_{52}H_{66}O_{16}N_8Cl_4$.

*Analysis.*—Calculated: C, 52.04%; H, 5.54%. Found: C, 51.40%; H, 5.66%. Solubility in water: 0.01%.

In the same way as the dibenzylamine salt the dibenzyl ethylene diamine salt can also be used for isolation and purification.

(f) The calcium salt.

In order to produce the calcium salt the acid was dissolved in aqueous alcohol and one equivalent of calcium acetate was added. By evaporating in vacuo a white powder was obtained to which acetone was added. After filtering off the undissolved substance the calcium salt was precipitated with ether. A white water-soluble powder melting between 173 and 176° C. was obtained.

*Example 12*

(a) D-chloramphenicolcarbamidoisocaproic acid.

A solution of 16.3 g. of chloramphenicol in a mixture of 8 ml. of pyridine, 8.55 g. of methyl-D-isocyanatoisocaproate and 100 ml. of ethyl acetate was refluxed for 1 hour and then evaporated in a vacuum until dry, the resultant oil being repeatedly digested with petroleum ether. After again evaporating in vacuo, 21.3 g. of oil were obtained. After having been dissolved in 50 ml. of ethanol it was saponified by the addition of 23 ml. of a 2 N solution of sodium hydroxide. Having been allowed to stand at room temperature for 10 hours the mixture was diluted with water and the resultant cloudiness removed by shaking it out with ether. The acid in oily form was separated from the aqueous phase with dilute hydrochloric acid and extracted with ether. The ethereal phase was dried, treated with active carbon and evaporated until dry. 15.9 g. of a vitrified acid were thus obtained. A sample crystallized slowly from aqueous ethanol, melting between 78 and 80° C. Summary formula:

$$C_{18}H_{23}O_8N_3Cl_2$$

*Analysis.*—Calculated: C, 45.01%; H, 4.83%. Found: C, 44.34%; H, 4.97%.

(b) The dibenzylamine salt.

This was prepared by the method described in Example 11(d). The salt melted between 189 and 191° C. For analysis the product was recrystallized from a mixture of dimethyl formamide and water and dried for 2 hours at 110° C. Summary formula: $C_{32}H_{38}N_4O_8Cl_2$.

*Analysis.*—Calculated: C, 56.72%; H, 5.65%. Found: C, 56.75%; H, 5.81%. Solubility in water: 0.048%.

$[\alpha]_D^{20} = +21.7°$ (c.=5, in dimethyl formamide).

(c) The dibenzyl ethylene diamine salt.

This salt was prepared in a manner analogous to that described in Example 11(e). For an analysis it was recrystallized from aqueous ethanol and dried for 2 hours at 110° C. M.P.=183–185° C. Summary formula:

$$C_{52}H_{66}O_{16}N_8Cl_4$$

*Analysis.*—Calculated: C, 52.04%; H, 5.54%. Found: C, 51.97%; H, 5.62%. Solubility in water: 0.07%.

*Example 13*

(a) D,L-chloramphenicol carbamido isocaproic acid.

This compound was obtained by the method according to Example 12(a), the isocyanatocarboxylic ester employed being the methyl-DL-α-isocyanatoisocaproate. The acid thus obtained was amorphous.

(b) The dibenzylamine salt.

This salt was prepared by precipitating it from ethereal solutions of the acid. It can then be further purified. M.P.=160–183° C. For an analysis the salt was reprecipitated from a mixture of dimethyl formamide and water. Summary formula: $C_{32}H_{38}N_4O_8Cl_2$.

*Analysis.*—Calculated: C, 56.72%; H, 5.65%. Found: C, 56.33%; H, 5.91%. Solubility in water: 0.09%.

$[\alpha]_D^{20} = +11.7°$ (c.=5, in dimethylformamide).

(c) The sodium salt obtained from the carbamidoisocaproic acid as described in (a) melted between 145 and 148° C.

*Example 14*

D-threo-1-p-dichloroacetamidophenyl - 2 - dichloroacetamidopropane-1,3-diol-3-carbamido-acetic acid and the ethyl ester thereof.

A suspension of 4.04 g. 1-p-dichloroacetamido-2-dichloroacetamidopropane-1,3-diol (prepared according to U.S. patent specification No. 2,568,571) in 40 ml. ethylacetate and 1.29 g. ethyl isocyanatoacetate in 2 ml. dry pyridine were heated under reflux. After dissolution of the suspended component the heating was continued for 30 minutes. After cooling petroleum ether was added until rendering turbid. The ester crystallized after rubbing and cooling. The crystallized solid was separated, washed with petroleum ether and dried. 4.6 g. ester (86% of theory) were obtained. For an analysis, this was recrystallized from dilute ethanol. Needles having a melting point of 196–198° C. were obtained. Summary formula:

$$C_{18}H_{21}N_3O_7Cl_4$$

molecular weight: 533.22.

*Analysis.*—Calculated: C, 40.56%; H, 3.97%; Cl, 26.60%. Found: C, 40.29%; H, 4.05%; Cl, 25.95%.

$R_f$-value (thin layer chromatography): 0.79; [adsorbens: silicagel ($GF_{254}$) running agent: butanol, saturated with ammonia (3%)].

For saponification 2 g. of the ester were dissolved in 10 ml. ethanol and 2 ml. 2 N sodium hydroxide were added. Having been allowed to stand at room temperature for 24 hours, the mixture was diluted with water and three times extracted with ethyl acetate to separate unsaponified portions. After acidification of the aqueous solution, the acid was extracted with ethyl acetate. The ester solution was dried and evaporated, whereby 1.2 g. of an oily acid remain. This acid crystallized from ethyl acetate with 1 mol of ethyl acetate. For an analysis this was twice recrystallized from a little amount of ethyl acetate. Summary formula: $C_{16}H_{17}N_3O_7Cl_4 \cdot C_4H_8O_2$; molecular weight: 593.27; M.P.=97–99° C.

*Analysis.*—Calculated: C, 40.49%; H, 4.25%. Found: C, 40.64%; H, 4.30%.

$R_f$-value (thin layer chromatography): 0.22 [adsorbens: silicagel ($GF_{254}$) running agent: butanol, saturated with ammonia (3%)].

In order to prepare the sodium salt, a solution of the acid in ethyl acetate was extracted with an aqueous solution containing the stoichiometrical amount of sodium bicarbonate. After evaporation of the aqueous solution, the sodium salt was obtained in the form of a white, water-soluble powder.

*Example 15*

D-threo-1-p-nitrophenyl-2 - azidoacetyl aminopropane-1,3-diol-3-carbamido acetic acid and ethylester thereof.

A mixture of 10 g. threo-1-p-nitrophenyl-2-azidoacetyl-aminopropane-1,3-diol, 4.3 g. ethylisocyanatoacetate and 6.7 ml. pyridine was refluxed for 1 hour in 60 ml. ethylacetate. A clear solution was obtained, which was evaporated to dryness in vacuo. The remaining oily residue crystallized after trituration with ether. The crystalline solid was separated, dried and recrystallized from dilute ethanol, whereby 11.8 g. (82% of theory) of the ester (M.P. 111–113° C.) were obtained. Summary formula: $C_{16}H_{20}N_6O_8$; molecular weight: 424.39.

*Analysis.*—Calculated: C, 45.28%; H, 4.75%. Found: C, 45.15%; H, 4.70%;

$R_f$-value (thin layer chromatography): 0.70; [adsorbens: silicagel ($GF_{254}$) running agent: butanol, saturated with ammonia (3%)].

For saponification the ester was dissolved in ethanol and a stoichiometrical amount of 2 N sodium hydroxide was added. Having been allowed to stand at room temperature for 14 hours, the obtained yellow solution was diluted with water, extracted with ethylacetate to remove the unsaponified portions and the aqueous solution was acidified with dilute hydrochloric acid. An oily acid separated, which was extracted with ethylacetate. The ethylacetate solution has been dried, decolorized with charcoal and extracted with portions of an aqueous solution of sodium bicarbonate until the pH-value amounted to 7. The solution as obtained was evaporated to dryness. The residue was dissolved in acetone, the obtained solution was filtered, evaporated in a vacuum and dried at 100° C. The sodium salt so obtained in the form of a white powder was chromatographically unitary.

$R_f$-value (thin layer chromatography): 0.13; [adsorbens: silicagel ($GF_{254}$) running agent: butanol, saturated with ammonia (3%)].

*Example 16*

D-threo-1-p-nitrophenyl-2-azidoacetyl - aminopropane-1,3 - diol - 3 - carbamidoisocaproic acid and methylester thereof.

A mixture of 5.9 g. threo-1-p-nitrophenyl-2-azido-acetylaminopropane-1,3-diol, 3.4 g. of methyl - L - isocyanatoisocaproate and 4 ml. pyridine was refluxed in 40 ml. ethylacetate for 1 hour. After evaporation of the solution in vacuo, the ester was obtained in the form of a difficultly crystallizing oil, which was directly saponified. For saponification, the oil was added to ethanol (20 ml.) and 10 ml. of an aqueous solution of sodium hydroxide and allowed to stand at room temperature for 5 hours. Then, the solution was diluted with water and extracted three times with ethylacetate to remove impurities.

The aqueous solution was acidified with dilute hydrochloric acid and extracted with ether. 4 ml. dibenzylamine were added to the etheric solution of the acid, thereby a crystalline salt separates. After separation, washing with ether and drying, 7.5 g. dibenzylamine salt were obtained.

Recrystallisation from ethanol gives a salt having a melting point of 158–160° C. Summary formula: $C_{32}H_{39}N_7O_8$; molecular weight: 649.72.

*Analysis.*—Calculated: C, 59.16%; H, 6.05%. Found: C, 58.90%; H, 6.13%.

$R_f$-value (thin layer chromatography): 0.25; [adsorbens: silicagel ($GF_{254}$) running agent: butanol, saturated with ammonia (3%)].

The dibenzylamine salt was decomposed by shaking a suspension thereof in dilute ethanol containing hydrochloric acid and extraction with an organic solvent. The sodium salt of the above-named caproic acid may be obtained from the organic phase by extraction with an aqueous sodium bicarbonate solution and evaporation of the aqueous solution.

*Example 17*

Threo-1-p-nitrophenyl-2-phenylacetamidopropane - 1,3-diol-3-carbamidoacetic acid and ethylester thereof.

(a) Ethylester.

A mixture of 6.6 g. (0.02 mol) D-threo-1-p-nitrophenyl-2-phenylacetamido-propane-1,3 - diol [prepared from D-threo-1-p-nitrophenyl-2-amino-propanediol-1,3 and phenylacetyl-chloride (M.P. 110° C.), $[\alpha]_D^{20}=+4.8°$ ($c.=1$, in ethanol)], 40 ml. ethylacetate, 4 ml. pyridine and 2.4 ml. ethyl-isocyanatoacetate was refluxed for 1 hour. The remaining oil solidified when triturated with ether. By recrystallisation from an ethanol water mixture, 6.4 g. (70% of theory) of the ester, having an M.P. of 132–133° C., were obtained. For an analysis this was twice recrystallized from dilute ethanol (M.P.=134° C.). Summary formula: $C_{22}H_{25}N_3O_8$.

*Analysis.*—Calculated: C, 57.51%; H, 5.48%. Found: C, 57.59%; H, 5.65%; $[\alpha]_D^{20}=+18.7°$ ($c.=1$, in ethanol).

(b) Sodium salt.

In order to prepare the free acid, the ester was treated with a 2 N solution of sodium hydroxide in dilute ethanol and worked up in the usual manner. Thereby an oily acid was obtained. The sodium salt was prepared in a manner analogous to that described in Example 11(c). A chromatographically pure, white powder was obtained.

$R_f$-value (thin layer chromatography): 0.20; [adsorbens: silicagel ($GF_{254}$) running agent: butanol, saturated with ammonia (3%)].

$[\alpha]_D^{20}=+18.1°$ ($c.=1$, in water).

*Example 18*

Threo-1-p-nitrophenyl-2-phenoxyacetamidopropane - 1,3-diol-3-carbamidoacetic acid and ethylester thereof.

A mixture of 6.92 g. D-threo-1-p-nitrophenyl-2-phenoxy-acetamidopropanediol-1,3 [obtained by acylation of D-threo-1-p-nitrophenyl-2-aminopropanediol-1,3 by use of phenoxyacetylchloride in aqueous acetone in the presence of sodium bicarbonate; M.P.=132–133° C. (from aqueous ethanol). Summary formula: $C_{17}H_{18}N_2O_6$.

*Analysis.*—Calculated: C, 58.95%; H, 5.24%. Found: C, 58.80%; H, 5.31%.

$[\alpha]_D^{20}=-48.1°$ ($c.=1$, in ethanol), 40 ml. ethyl acetate, 4 ml. pyridine and 2.4 ml. ethyl-isocyanatoacetate was refluxed for 30 minutes. After evaporation until dry a non-crystallizing oil was obtained. This oil was dissolved in 20 ml. ethanol and saponified by addition of 10 ml. 2 N sodium hydroxide solution. Having been allowed to stand at 40° C. for 1 hour, the mixture was diluted with water, twice extracted with ethylacetate and the acid was precipitated from the aqueous phase by addition of dilute hydrochloric acid. After extraction with ethylacetate, drying and evaporation, 5.5 g. of an oily product were obtained which crystallizes from aqueous ethanol. M.P. =140–142° C. Summary formula: $C_{20}H_{21}N_3O_9$.

*Analysis.*—Calculated: C, 53.69%; H, 4.73%. Found: C, 53.52%; H, 4.91%. $[\alpha]_D^{20}=-3.19°$ ($c.=1$, in ethanol).

Example 19

Threo-1-p-nitrophenyl-2-benzamidopropane-1,3 - diol-3-carbamido-α-glutaric acid and dimethylester thereof.

(a) Dimethylester.

A mixture of 6.3 g. D-threo-1-p-nitrophenyl-2-benzamidopropanediol-1,3 [prepared from D-threo-1-p-nitrophenyl-2-aminopropanediol-1,3 and benzoylchloride in a mixture of acetone and water in the presence of sodium-bicarbonate. M.P.=172° C., $[\alpha]_D^{20}=-121.5°$ ($c.=1$, in ethanol). Summary formula: $C_{16}H_{16}N_2O_5$.

*Analysis.*—Calculated: C, 60.75%; H, 5.10%. Found: C, 60.47%; H, 5.18%], 40 ml. ethylacetate, 4 ml. pyridine and 4 g. dimethyl-L-isocyanatoglutarate was refluxed for 30 minutes. After evaporation until dry, the residue was crystallized from aqueous ethanol. 4.7 g. ester having an M.P. of 161–163° C. were obtained. For an analysis this product was twice recrystallized from ethanol. M.P.=165° C. Summary formula: $C_{24}H_{27}N_3O_{10}$.

*Analysis.*—Calculated: C, 55.70%; H, 5.26%. Found: C, 56.02%; H, 5.37%; $[\alpha]_D^{20}=-56.5°$ ($c.=1$, in dimethylformamide).

(b) Sodium salt.

The sodium salt as obtained after saponification of the ester in a 2 N solution of sodium hydroxide is a white, chromatographically, pure powder.

$R_f$-value (thin layer chromatography): 0.68; [adsorbens: silicagel (GF$_{254}$) running agent: glacial acetic acid: butanol:water; 60:20:20]; $[\alpha]_D^{20}=-39.9°$ ($c.=1$, in water).

Example 20

Threo-1-p-nitrophenyl-2-benzamidopropane-1,3 - diol-3-carbamido-acetic acid and ethylester thereof.

(a) Ethylester.

A mixture of 6.3 g. D-threo-1-p-nitrophenyl-2-benzamidopropanediol-1,3 (see Example 19), 40 ml. ethyl acetate, 4 ml. pyridine and 2.4 ml. ethylisocyanato acetate was refluxed for 30 minutes and then evaporated. The resultant oil (6.9 g.) solidified when triturated with ether. After recrystallisation from aqueous ethanol the M.P. was 161–162° C. Summary formula: $C_{21}H_{23}N_3O_8$.

*Analysis.*—Calculated: C, 56.63%; H, 5.20%. Found: C, 56.45%; H, 5.30%; $[\alpha]_D^{20}=+46.6°$ ($c.=1$, in ethanol).

(b) Sodium salt.

White, chromatographically, pure powder.

$R_f$-value (thin layer chromatography): 0.70; [adsorbens: silicagel (GF$_{254}$) running agent: glacial acetic acid: butanol:water; 60:20:20]; $[\alpha]_D^{20}=+46.5°$ ($c.=1$, in water).

Example 21

Threo-1-p-nitrophenyl - 2 - isobutyramido-propane-1,3-diol-3-carbamido acetic acid and ethylester thereof.

(a) Ethylester.

A mixture of 2 g. D-threo-1-p-nitrophenyl-2-isobutyramido-propanediol-1,3 [prepared from D-threo-1-p-nitrophenyl-2-amino-propanediol-1,3 and isobutyric acid chloride in an ethylacetate/water-mixture in the presence of sodium-bicarbonate. M.P.=138° C. Summary formula: $C_{13}H_{18}N_2O_5$.

*Analysis.*—Calculated: C, 55.31%; H, 6.43%. Found: C, 55.17%; H, 6.54%; $[\alpha]_D^{20}=+23.2°$ ($c.=1$, in ethanol)], 20 ml. ethylacetate, 14 ml. pyridine and 0.92 g. ethyl-isocyanato acetate was refluxed for 40 minutes and then evaporated in a vacuum until dry. The residue was recrystallized from aqueous ethanol. 2.1 g. of the ester, having an M.P. of 137° C., were thus obtained. Summary formula: $C_{18}H_{25}N_3O_8$.

*Analysis.*—Calculated: C, 52.55%; H, 6.12%. Found: C, 52.54%; H, 6.20%; $[\alpha]_D^{20}=+34.2°$ ($c.=1$, in ethanol).

(b) Sodium salt.

White, chromatographically pure powder.

$R_f$-value (thin layer chromatography): 0.15; [adsorbens: silicagel (GF$_{254}$) running agent: butanol, saturated with ammonia (3%)].

$[\alpha]_D^{20}=-18.5°$ ($c.=0.6$, in water).

Experiments have disclosed that chloramphenicol succinate solutions completely decompose when they are heated at 120° C. for one hour, whereas similarly treated solutions or suspensions of D-threo-1-phenyl-2-aminopropane-1,3-diol carbamidocarboxylates or carboxylic acids of general Formula I or their salts remain unchanged. From solutions or suspensions thus treated the reactive agent can be recovered quantitatively. Although the novel compounds are inactive in vitro they develop their full activity in vivo as illustrated by the following tests.

The blood level tests were performed on rabbits. Ten rabbits were used for the experiments and gave the results listed in Table 2, an aqueous solution of the sodium salt of chloramphenicol carbamidoacetic acid, corresponding to 75 mg./kg. of chloramphenicol, having been intramuscularly injected. The animals accepted the injections without any signs of pain or other secondary effects. For the determination of blood level, samples of the animals' blood were taken at the end of the times shown in Table 2 and the antibiotic activity was determined by reference to a chloramphenicol standard in a series dilution test with the test organism *Staphylococcus aureus* SG 511.

TABLE 2

| After | Blood level values (in γ/ml.) | | | | | |
|---|---|---|---|---|---|---|
| | 30 min. | 1 h. | 2 h. | 4 h. | 8 h. | 24 h. |
| Mean value (10 tested animals) | 13.00 | 13.00 | 16.00 | 17.00 | 7.75 | 8.75 |
| Scatter | 3.50 | 3.50 | 3.16 | 2.58 | 0.79 | 1.32 |

From the blood level tests it appears that the substance is quantitatively split in vivo.

The toxicity of this compound is perceptibly lower than that of chloramphenicol monosuccinate, as borne out by the following comparative data:

LD$_{50}$ (subcutaneous in white mice):      Mg./kg.
  Sodium salt of the chloramphenicol-carbamido acetic acid _____ 7400
  Chloramphenicol monosuccinate sodium ____ 1850

In tests on humans the novel D-threo-1-phenyl-2-amino-propane-1,3-diol derivatives, such as the sodium salt of chloramphenicolcarbamido-isocaproic acid, proved to be perceptibly superior to the known chloramphenicol compounds or its analogues, such as chloramphenicol monosuccinate, both in relation to the height and/or the duration of the blood level values.

After oral administration in animal tests the novel D-threo-1-phenyl - 2 - amino-propane-1,3-diol derivatives were found to be readily resorbed and to have a distinct depot effect when compared with chloramphenicol and its analogues. The effect that can be achieved is illustrated by comparative tests which gave the results collated in Tables 3 to 5.

TABLE 3.—BLOOD LEVEL VALUES IN γ/ML. AFTER ORAL ADMINISTRATION OF 75 MG./KG. OF CHLORAMPHENICOL IN RABBITS

| After | Blood level values (in γ/ml.) | | | | |
|---|---|---|---|---|---|
| | 1 h. | 2 h. | 4 h. | 8 h. | 24 h. |
| Mean value (10 tested animals) | 25.50 | 23.00 | 18.50 | 13.50 | 8.25 |
| Scatter | 10.92 | 11.11 | 7.09 | 3.37 | 1.21 |

TABLE 4.—BLOOD LEVEL VALUES IN γ/ML. AFTER ORAL ADMINISTRATION OF CHLORAMPHENICOLCARBAMIDO ACETIC ACID, CORRESPONDING TO 75 MG./KG. CHLORAMPHENICOL IN RABBITS.

| After | Blood level values (in γ/ml.) | | | | |
|---|---|---|---|---|---|
| | 1 h. | 2 h. | 4 h. | 8 h. | 24 h. |
| Mean value (5 tested animals) | 26.0 | 18.0 | 16.0 | 14.0 | 13.5 |
| Scatter | 15.17 | 8.37 | 5.48 | 4.18 | 4.87 |

Table 5 illustratively exemplifies the prolongation of blood level values that can be achieved with two of the chloramphenicol analogue derivatives that are obtainable according to the invention. The compounds were tested in the same way as above. The values given in the table are mean values obtained when testing 5 rabbits.

TABLE 5

| Compound (parenteral administration) | Hours | | | | |
|---|---|---|---|---|---|
| | 1 | 2 | 4 | 8 | 24 |
| Threo-1-p-nitrophenyl-2-azidoacetyl-aminopropane-1,3-diol-3-carbamido-acetic acid | 8.5 | 9.0 | 9.0 | 6.5 | 6.0 |
| Threo-1-p-nitrophenyl-2-azidoacetyl-aminopropane-1,3-diol-carbamido-isocaproic acid | 8.5 | 9.5 | 8.5 | 7.5 | 7.5 |
| (Comparison) threo-1-p-nitrophenyl-2-azido-acetyl-aminopropane-1,3-diol | 9.5 | 8.5 | 8.0 | 4.5 | 3.0 |

The new D-threo-1-phenyl-2-aminopropane-1,3-diol derivatives and the salts of the acids of the general formula I can be administered orally, parenterally, or in the form of suppositories. Compositions as they are used for the purpose of the present invention comprise, for instance, tablets, pills, dragees, lozenges, and the like shaped preparations. The compounds may also be administered in powder form, preferably enclosed in gelatin and the like capsules. Oral administration in liquid form, such as in the form of solutions, emulsions, suspensions, syrups, and the like is also possible. These solid and liquid preparations are produced in a manner known to the art of compounding and processing pharmaceutical products whereby the conventional diluting agents, binding agents, lubricants, expanding agents, and the like excipients, such as lactose, cane sugar, dextrins, starch, talc, kaolin, magnesium hydroxide, magnesium carbonate, pectin, gelatin, agar, bentonite, stearic acid, magnesium stearate, and others are employed.

The following examples serve to illustrate such pharmaceutical preparations without, however, limiting the same thereto.

*Example 22*

Injectable solution.
775 g. sodium - L - chloramphenicol - carbamido-isocaproate, corresponding to 500 g. chloramphenicol, are dissolved in a sufficient amount of bidistilled sterilized water to obtain 5,000 ml. solution. The solution is filled into ampoules, each ampoule containing 5 ml. and the ampoules are sterilized in an autoclave at 120° C.

Dosage: 2 times a day 1 ampoule (provided for intravenous or intramuscular application).

*Example 23*

Injectable suspension.
1850 g. of the dibenzylethylene diamine salt of L-chloramphenicol carbamido isocaproic acid, corresponding to 1,000 g. chloramphenicol, and a sufficient amount of a usual suspending agent are suspended in such an amount of bidistilled sterilized water to obtain 5,000 ml. solution. The suspension is filled into ampoules, each ampoule containing 5 ml. and the ampoules are sterilized in an autoclave at 120° C.

Dosage: 1 ampoule a day (provided for intramuscular application).

*Example 24*

Syrup.
Ethyl-L-chloramphenicol carbamido isocaproate

Corresponding to 2.5 g. chloramphenicol ____mg__ 3,925
Flavoring agent (a sufficient amount), and aqua destillata ad _____ml__ 100

Dosage: 1 tablespoonful, 4 times a day.

It should be understood, of course, that the foregoing disclosure relates to only preferred embodiments of the present invention and that it is intended to cover all changes and modifications of the examples of the invention herein chosen for the purpose of the disclosure which do not constitute departures from the spirit and scope of the present invention set forth herein and in the appended claims.

We claim:

1. A compound selected from the group consisting of a D-threo-1-phenyl-2-aminopropane-1,3-diol derivative, having the formula $$R^1-\underset{}{\underset{}{\bigcirc}}-\underset{O}{\overset{OH}{\underset{|}{C}}}-\underset{NHR^2}{\overset{H}{\underset{|}{C}}}-\overset{H}{\underset{|}{C}}-O-CO-NH-\overset{R^4}{\underset{|}{C}H}-X^1-COOR^5$$

wherein
$R^1$ is a member selected from the group consisting of the methyl sulphonyl group, the nitro group, and the dichloro acetamido group,
$R^2$ is a member selected from the group consisting of the azidoacetyl group, the dichloroacetyl group, a phenoxy (lower) alkanoyl group, a (lower) alkanoyl group, a phenyl (lower) alkanoyl group, and a benzoyl group,
$R^4$ is a member selected from the group consisting of a hydrogen atom, an alkyl radical containing up to 6 carbon atoms, an alkyl radical having an interposed sulphur atom and containing up to 6 carbon atoms, a lower carbalkoxy radical, a lower carbalkoxy lower alkyl radical, and a phenyl radical,
$R^5$ is a member selected from the group consisting of hydrogen and a lower alkyl radical,
$X^1$ is a member selected from the group consisting of a direct C—C bond and a $(CH_2)_n$ group, wherein $n$ is an integer from 1 to 6, and a pharmaceutically acceptable non-toxic salt of the acid with organic and inorganic bases.

2. D-threo-1-p-nitrophenyl-2-dichloroacetamidopropane-1,3-diol-3-carbamidoacetic acid.

3. D-threo-1-p-nitrophenyl-2-dichloroacetamidopropane-1,3-diol-3-carbamidoisocaproic acid.

4. D-threo-1-p-dichloroacetamidophenyl-2-dichloroacetamidopropane-1,3-diol-3-carbamidoacetic acid.

5. D-threo-1-p-nitrophenyl-2-azidoacetylaminopropane-1,3-diol-3-carbamidoacetic acid.

6. D-threo-1-p-nitrophenyl-2-azidoacetylaminopropane-1,3-diol-3-carbamidoisocaproic acid.

7. D-threo-1-p-nitrophenyl-2-phenylacetamidopropane-1,3-diol-3-carbamidoacetic acid.

8. D-threo-1-p-nitrophenyl-2-phenoxyacetamidopropane-1,3-diol-3-carbamidoacetic acid.

9. D-threo-1-p-nitrophenyl-2-benzamidopropane-1,3-diol-3-carbamido-α-glutaric acid.

10. D-threo-1-p-nitrophenyl-2-benzamidopropane-1,3-diol-3-carbamidoacetic acid.

11. D-threo-1-p-nitrophenyl-2-isobutyramidopropane-1,3-diol-3-carbamido acetic acid.

References Cited

UNITED STATES PATENTS 2,988,481  6/1961  Gregory ------------ 167—65

OTHER REFERENCES

Burger, Medicinal Chemistry (Interscience, New York, 1960), pp. 914–918.

NORMA S. MILESTONE, *Acting Primary Examiner.*

C. M. SHURKO, *Assistant Examiner.*